(12) United States Patent
Agren et al.

(10) Patent No.: US 6,302,983 B1
(45) Date of Patent: Oct. 16, 2001

(54) METHOD FOR LINING UNDERGROUND PIPELINES

(75) Inventors: Lennart Agren; Arne Lund, both of Boras (SE); Alan John Dickinson, Kirkby-In-Ashfield (GB); Veli-Pekka Jormakka, Hollolla (FI); Bo Mollsjo, Bramhult; Harri Leo, Fristad, both of (SE); Jyri Jarvenkyla, Hollola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 09/101,624
(22) PCT Filed: Jan. 13, 1997
(86) PCT No.: PCT/SE97/00032
§ 371 Date: Oct. 28, 1998
§ 102(e) Date: Oct. 28, 1998
(87) PCT Pub. No.: WO97/25567
PCT Pub. Date: Jul. 17, 1997

(30) Foreign Application Priority Data

Jan. 11, 1996 (SE) .................................................. 9600091
Sep. 20, 1996 (WO) .................................. PCT/SE96/01169

(51) Int. Cl.[7] .................................................. B32B 35/00
(52) U.S. Cl. .......................... 156/94; 156/94; 156/287; 156/294; 156/273.7
(58) Field of Search ......................... 138/98, 97; 156/287, 156/294, 94, 272.2, 273.7; 264/36.16, 36.17, 36.22, 515, 516, 573

(56) References Cited

U.S. PATENT DOCUMENTS

| | | | |
|---|---|---|---|
| 3,560,291 | * 2/1971 | Foglia et al. | 156/229 |
| 4,386,628 | * 6/1983 | Stanley | 138/97 |
| 4,394,202 | * 7/1983 | Thomas et al. | 156/94 |
| 4,781,780 | * 11/1988 | Hannover | 156/287 |
| 4,867,921 | * 9/1989 | Steketee, Jr. | 264/36 |
| 4,871,413 | * 10/1989 | Hyodo et al. | 156/382 |
| 5,205,886 | * 4/1993 | White | 156/71 |
| 5,366,669 | * 11/1994 | Maine et al. | 156/158 |
| 5,395,472 | * 3/1995 | Mandich | 156/287 |

* cited by examiner

Primary Examiner—Michael W. Ball
Assistant Examiner—Gladys Piazza
(74) Attorney, Agent, or Firm—Harris Beach LLP

(57) ABSTRACT

A method for renovation of pipelines, comprising introduction of lining layers into the existing pipeline, the lining layers corresponding in length to the length of the pipeline to be renovated. The lining layers consist of fusible polymers and are presurized and fused together by the introduction of a heat source into the inside of the innermost lining layer.

13 Claims, 3 Drawing Sheets

METHOD FOR LINING UNDERGROUND PIPELINES

BACKGROUND OF THE INVENTION

1. Field of the Invention

The present invention relates to a method for renovation of underground pipelines preferably for sewage, comprising introduction of a lining pipe into an existing pipeline, said lining pipe having a length corresponding to the length to be renovated, and consisting of a fusable polymer in a folded condition, and unfolding of the lining pipe in order to line the pipeline.

2. Description of the Invention Background

Folded pipes have already been used for lining pipelines for example according to SE-911948-9, where above all a combination of PE and PVC has given the prerequisites of the use of the concept relating to folded pipes. The basic concept of this technique is that a length of coiled prefabricated folded pipe material without transverse welding is transported successively into e.g. a manhole and is located in an existing pipeline to be lined, said pipeline connecting to the manhole. Introduction of a pipe in a folded condition makes possible to line with a pipe having the same outside diameter as the inside diameter of the existing pipelines. Thereby the capacity of the pipeline substantially can be maintained, no additional arrangements for fixing the pipe in its longitudinal direction being required and the connection of so called service pipelines being facilitated. When lining larger pipelines (Ø≧300 mm) this technique has, however, not been possible to use, mainly due to difficulties in handling folded pipes of souch dimensions. This as a consequence of larger handling forces being required as well as problems with cracking in the fold areas of the pipes of larger dimensions. Moreover, the coils of the folded pipes have also been difficult, if not impossible, to handle in a normal environment, not the least of which is transportation on a truck, as a consequence of the dimensions of the folded pipes. This means, generally speaking, that the diameter of such a coil be in order not to require special transport, must not be larger than 2400 mm. In order to unfold lining pipes according to conventional methods it has also been necessary to preheat the lining pipe to a temperature of between 100° C. and 120° C. Moreover, at the lower temperature it has been necessary to apply an inner over-atmospheric pressure of about 5 bar, which for large dimensions sets high demands on security arrangements around the lining operation.

SUMMARY OF THE INVENTION

According to the invention described herein there is presented a solution to the problem of lining existing underground pipelines having a diameter >300 mm with a continuous lining pipe introduced into the pipeline, the lining pipe being built up by introducing lining layers into the pipeline to be lined, pressurising the layers and successively fusing them together by exposing each layer to fusion heat from a heat source which is carried along the inside surface of the innermost layer of the lining built up so far. The consecutively introdused lining layers may alternately be opaque and translucent to heating enegy to make fusion of more than two layers possible in one fusion step.

The method described makes it possible to line existing pipelines having a diameter up to at least 800 mm.

By the use of the method and the use of a smaller relative wall thickness equipment, such as coils of lining material etc., will be leas bulky and easier to handle.

It will also be possible to build up the pipe wall material for any application in an environmentally or cost optimised way so that only the outer layer may provide structural tensile properties and durability, while intermediate layers may provide only tensile properties and the inner layer/layers may be adapted to the medium the pipline is intended for. A proper example is the use of PEX (Cross-linked Polyethylene) crosslinking during fusion after its introduction into the pipeline. Another example is the use of a foam as one of the layers, which is caused to react by means of fusion heat.

A lining according to the invention eliminates the risk for subsoil water penetrating between the existing pipeline and the lining due to the existing pipeline being in a too bad condition. In the worst case this may lead to the lining floating on the surface of the water with the consequence that sooner or later it may rupture due to abrasion or fatigue.

BRIEF DESCRIPTION OF THE DRAWINGS

The invention will be described in more detail below with reference to an embodiment shown in the accompanying drawings, in which.

DETAILED DESCRIPTION OF THE PREFERRED EMBODIMENTS

Figure 1:
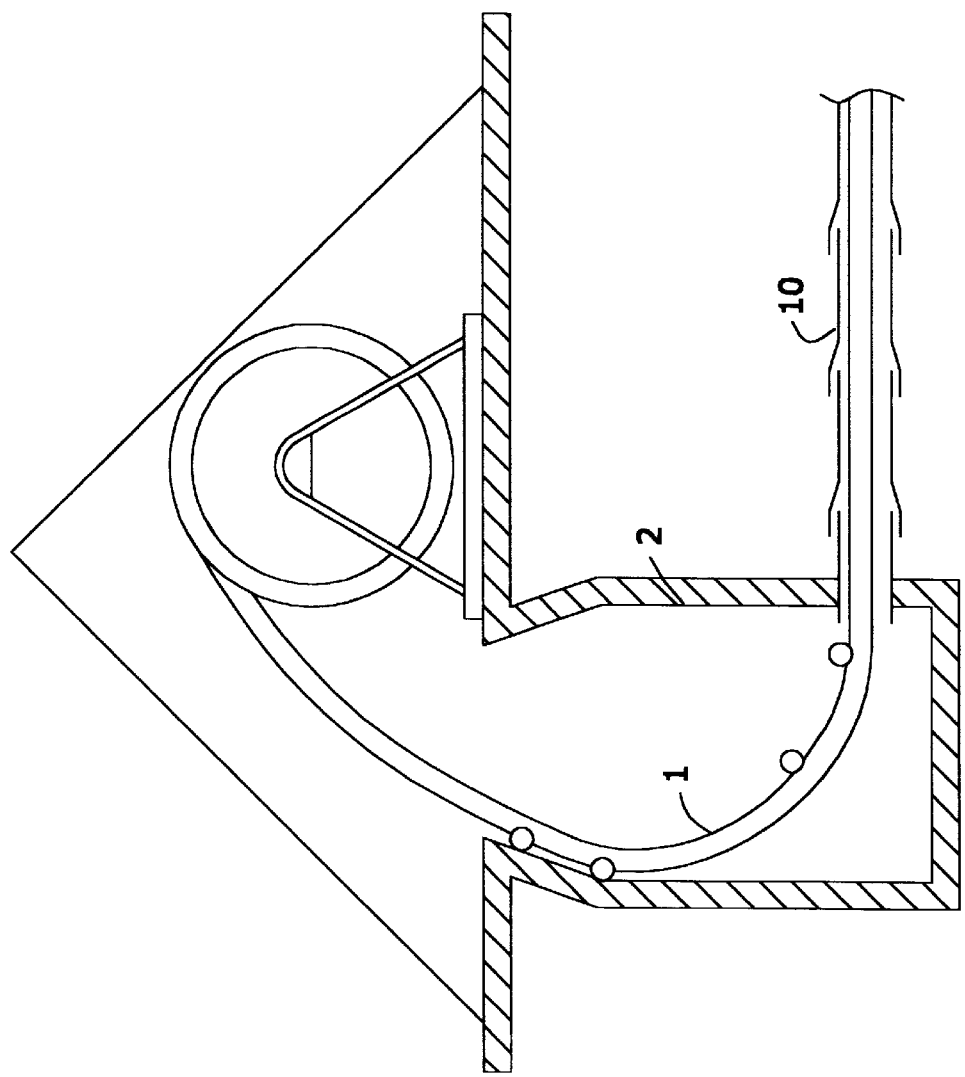
FIG. 1 schematically illustrates the principle for introducing a folded length of lining into an existing pipeline via a manhole.

FIG. 1 generally illustrates the method of passing a folded first lining layer 1 into a manhole 2 and into a pipeline 10 to be lined. With the aid of FIG. 1 it will be understood how the lining layer 1 in its entirety is introduced into the pipeline 10 to be lined up to the next corresponding manhole (not shown). However, FIG. 1 does not show that the layers are so thin (between 1 and 5 mm, preferably about 3 mm) that they do not require heating in order to be able to be passed down as required according to the state of the art. The material in itself is flexible enough. After the first layer 1 having been located, said layer preferably being translucent, the folded lining layer is sealed at both ends and then an inner over-pressure of up to 1.5 bar is applied. As a consequence thereof the layer will be unfolded and will be pressed against the inside surface of the existing pipeline 10. Thereafter the seal of the lining layer is opened at one of its ends and another lining layer 4, this time preferably opaque, is introduced and unfolded by over-pressure as previously described. When introducing the second and next layers, a plug (not shown) that tightens against the preceding layer can be used, which also can be driven through the pipeline by pressure. Then a further preferably translucent lining layer 5 is introduced in the same manner, and after at least one end seal having been opened (this is possible because the material in this condition has sufficient shape stability), a self-propelled heating device 3 (see FIG. 3), emitting infrared light, is driven back and forth inside the lining, whereby the innermost translucent layer 5 in the pipeline by melting together with the adjacent opaque layer 4 as a consequence of heat emission also brings the outermost layer to such a temperature that also the layers 1 and 4 melt together. During the heating phase, the pressure is maintained in the pipeline in order to press the liner against the pipeline and to create the necessary welding/fusing pressure between the layers. At the same time (pressurised) air is circulated in the pipe to ventilate possible reaction gases. When the three first layers 1, 4, 5 have been located and melted together in the pipeline to be lined, lining layers 6, 7, 8, 9; . . . etc. are introduced two and two, first preferably an opaque layer and then preferably a translucent layer, whereafter heating as mentioned above is carried out, said introduction and heating operations being repeated until a required wall thickness of the completed lining pipe has been obtained.

Figure 2B:
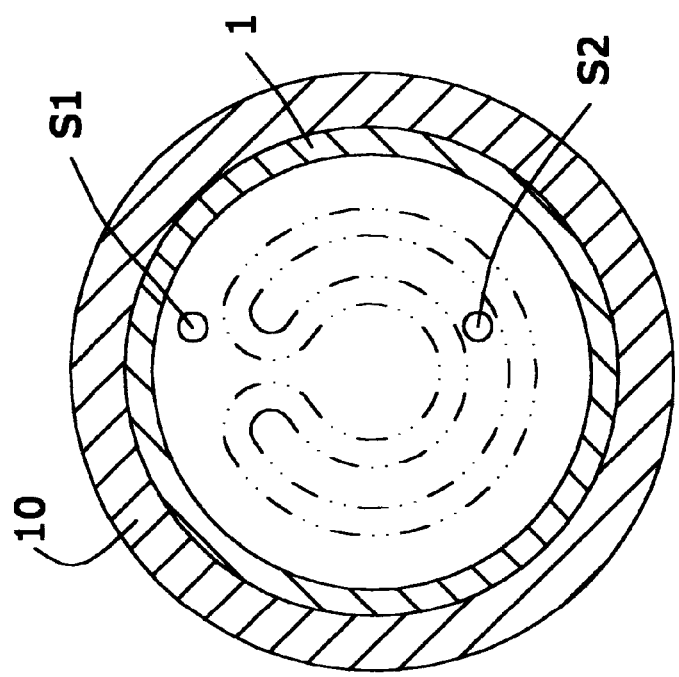
FIG. 2b is a view corresponding to that one in FIG. 2a, wherein the lining has been unfolded.
Figure 2A:
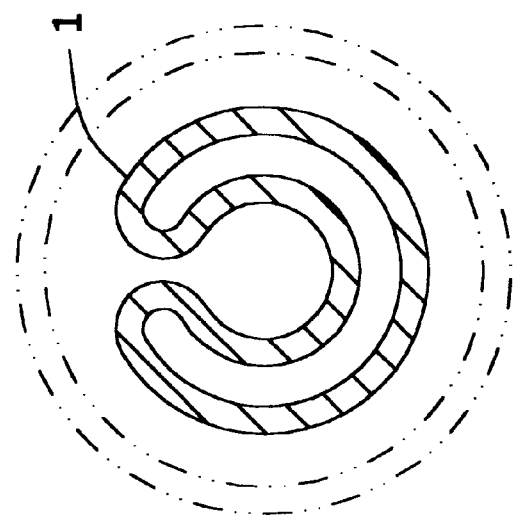
FIG. 2a is a diagrammatic cross sectional view of through a relining pipe in a folded condition.

In FIG. 2a it can be seen how a lining pipe layer 1, 4, and 5, etc. of the kind referred to is folded in the folded condition thereof when it is introduced into the pipeline to be lined. Moreover, it can be seen FIG. 2b how the first relining layer fits snugly against the inside surface of the pipeline. The layers 4, 5, then inserted in the same way fit snugly against the adjacent outside layer and are consequently accurately dimensioned in lining steps. It is also possible to use one or more lining layers that are coextruded, some of which may be textile reinforced. In FIG. 2b there is also shown in cross section hoses $S_1$ and $S_2$ which according to one embodiment of the invention are arranged in the associated lining layer for the application of an inner overpressure as well as circulating gas, as mentioned above. The folding pattern shown in FIG. 2 according to a modified embodiment may be more closely similar to a traditional firehose, in other words it is more or less completely flat.

Figure 3A:
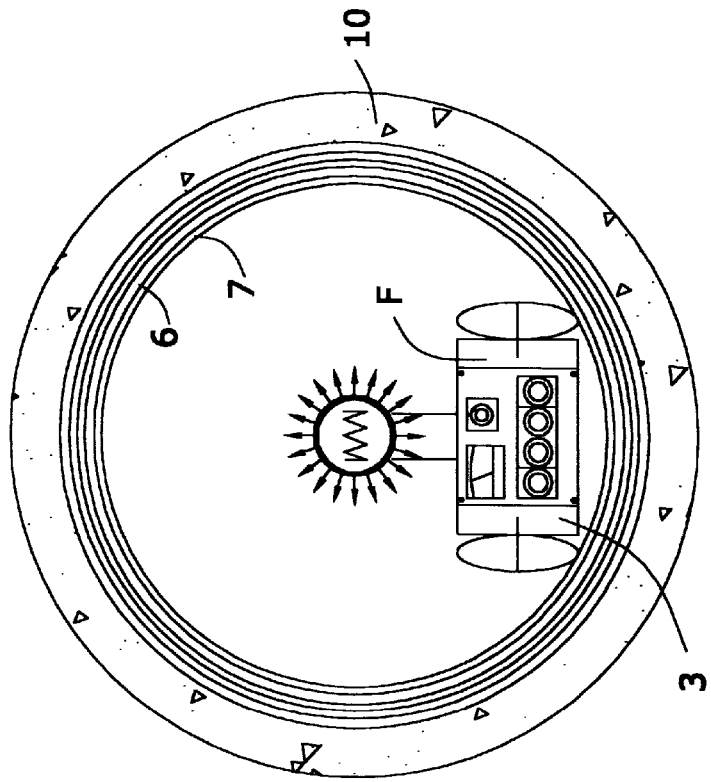
FIG. 3a is a cross sectional view of the pipeline illustrating how three unfolded lining layers are melted together.
Figure 3B:
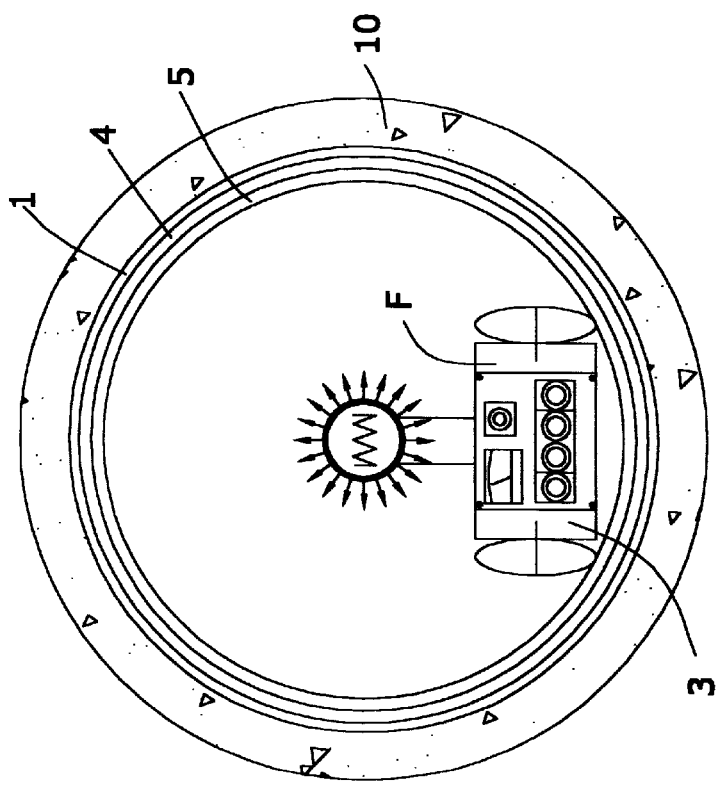
FIG. 3b is a view corresponding to FIG. 3a illustrating how three already integrated layers are melted together with forth and fifth layers.

In FIG. 3 it is diagrammatically illustrated how the self-propelled heating device 3 for said welding operation is constructed in accordance with a preferred embodiment. The heating device 3 comprises a chassis with driven wheels having a device mounted thereon which when activated together with the associated power and drive unit F, emits heat radiation preferably in the short wave infrared area. Due to the ambition to avoid IR-radiation absorption peaks, the wavelength ranges from 0.7 to 1.5 $\mu$m, and is preferably in the region of 1.15 $\mu$m, wherein the infrared radiation is the most intense per unit of time. The filtered wavelength and different absorption properties of the lining layers together prevent both the inner surface of the liner from being heated too much and the heating energy from being directed to the inner layer(s). The device mounted on the chassis extends in the longitudinal direction of the pipe in order to have an omnidirectional effect. The heating device may be driven from the one or the other end of the relining pipe. It is, however, an advantage if the heating device can roll on a surface having normal surrounding temperature.

What is claimed is:

1. Method for renovation of a length of a pipeline comprising introduction of a lining pipe into an existing pipeline, said lining pipe having a length corresponding to a length to be renovated and consisting of fusible polymer lining layers in a folded condition, and unfolding of the lining pipe in order to line the existing pipeline, comprising the steps of building up said lining pipe by successively introducing said lining layers (1,4,5,6,7,8,9) in the existing pipeline to be lined, successively pressuring said lining layers and fusing them together by exposing said lining layers (1, 4–9) to fusion heat from an infrared heat source (3), wherein said lining layers are alternately opaque and translucent to infrared heating energy from said infrared heat source (3), and wherein said infrared heat source (3) is carried along an inside surface of an innermost layer of said lining pipe built up so far.

2. Method according to claim 1, wherein at least one of the lining layers comprises PEX, and is cross-linked after its introduction into the existing pipeline.

3. Method according to claim 2, wherein the crosslinking is achieved during fusing of the lining layers.

4. Method according to claim 1 wherein two lining layers are introduced at the same time in the existing pipeline to be lined.

5. Method according to claim 1 wherein after the introduction of the lining layers (1,4) and after said lining layers having been subjected to pressure the pressure is at least to some extent lowered before the lining layers are fused together by means of a heating device, which is introduced at one of the ends of the lining layers.

6. Method according to claim 1 wherein the lining layers are adapted to the intended use of the existing pipeline by using differing materials for the lining layers depending on the radial position thereof.

7. Method according to claim 1 wherein at least one of the lining layers is a foam layer, which is caused to react by means of heating to fuse the foam layer.

8. Method according to claim 1, wherein use is made of IR wavelengths in the range of 0.7 to 1.5 $\mu$m.

9. Method according to claim 8 wherein coextruded layers are used.

10. Method according to claim 9, wherein one or more of said coextruded layers are textile reinforced.

11. Method according to claim 8 wherein the lining pipe at least partly comprises several independent layers which are fused together.

12. Method according to claim 1 wherein the lining layers are opaque and translucent alternately and that the heat source (3) is employed along at least every third lining layer introduced.

13. Method according to claim 1 wherein the lining layers are introduced into the existing pipeline through a manhole and wherein the ratio between an outside diameter and a wall thickness of the lining layers are less than 100.

* * * * *